(12) United States Patent
Bitter et al.

(10) Patent No.: US 10,102,633 B2
(45) Date of Patent: Oct. 16, 2018

(54) SYSTEM AND METHODS OF SEGMENTING VESSELS FROM MEDICAL IMAGING DATA

(71) Applicant: Lexmark International Technology Sarl, Genève (CH)

(72) Inventors: Ingmar Bitter, Maple (CA); Raghavendra Chandrashekara, Pickering (CA); Sandra Stapleton, Los Altos (CA); Sameer Zaheer, Mississauga (CA)

(73) Assignee: HYLAND SWITZERLAND SARL, Geneva (CH)

( * ) Notice: Subject to any disclaimer, the term of this patent is extended or adjusted under 35 U.S.C. 154(b) by 0 days.

(21) Appl. No.: 14/984,169

(22) Filed: Dec. 30, 2015

(65) Prior Publication Data

US 2017/0154435 A1 Jun. 1, 2017

Related U.S. Application Data

(60) Provisional application No. 62/261,161, filed on Nov. 30, 2015.

(51) Int. Cl.
*G06K 9/00* (2006.01)
*G06T 7/11* (2017.01)
(Continued)

(52) U.S. Cl.
CPC ............... *G06T 7/11* (2017.01); *G06T 7/181* (2017.01); *G06T 19/00* (2013.01); *G06T 2207/10081* (2013.01); *G06T 2207/10088* (2013.01); *G06T 2207/20101* (2013.01); *G06T 2207/30048* (2013.01); *G06T 2207/30101* (2013.01); *G06T 2207/30172* (2013.01); *G06T 2210/41* (2013.01)

(58) Field of Classification Search
None
See application file for complete search history.

(56) References Cited

U.S. PATENT DOCUMENTS 7,031,504 B1 * 4/2006 Argiro ............... A61B 6/504
382/131
7,324,104 B1 * 1/2008 Bitter ................. G06T 7/60
345/419
(Continued)

*Primary Examiner* — Weiwen Yang
(74) *Attorney, Agent, or Firm* — Zilka-Kotab, P.C.

(57) ABSTRACT

A method for segmenting a vessel from an image data that includes accessing the image data from which the vessel is segmented through a user display interface. A first seed point is then received from a user, the first seed point placed by the user on a first location on the image data. A second seed point is further received from the user, the second seed point placed by the user on a second location on the image data. The method further includes calculating a centerline for the vessel to be segmented, the centerline beginning at the first location and finishing at the second location as indicated by the first and the second seed points, respectively; calculating borders of the vessel to be segmented based on the centerline; and displaying an output of the vessel to be segmented using the centerline and the borders of the vessel, wherein the calculating the centerline comprises utilizing a minimum cost dual front propagation method that incrementally accumulates local vessel measures to determine a global optimal cost path and form the centerline.

20 Claims, 5 Drawing Sheets

(51) Int. Cl.
  *G06T 19/00*      (2011.01)
  *G06T 7/181*      (2017.01)

(56) References Cited

U.S. PATENT DOCUMENTS

| | | | |
|---|---|---|---|
| 2002/0128563 A1* | 9/2002 | Carlson | A61N 1/3622 600/509 |
| 2005/0110791 A1* | 5/2005 | Krishnamoorthy | G06T 7/60 345/419 |
| 2005/0249399 A1* | 11/2005 | Tek | G06T 7/11 382/154 |
| 2007/0024617 A1* | 2/2007 | Poole | G06T 7/60 345/424 |
| 2010/0040263 A1* | 2/2010 | Li | G06T 5/009 382/128 |
| 2010/0259542 A1* | 10/2010 | Visser | G06T 19/003 345/427 |
| 2010/0296718 A1* | 11/2010 | Ostrovsky-Berman | G06T 7/62 382/133 |
| 2012/0059245 A1* | 3/2012 | Buschmann | A61B 5/02007 600/419 |
| 2012/0236259 A1* | 9/2012 | Abramoff | A61B 3/12 351/206 |
| 2013/0072787 A1* | 3/2013 | Wallace | A61B 6/12 600/424 |

\* cited by examiner

SYSTEM AND METHODS OF SEGMENTING VESSELS FROM MEDICAL IMAGING DATA

CROSS REFERENCES TO RELATED APPLICATIONS

The present application is related to and claims priority under 35 U.S.C. 119(e) from U.S. provisional patent application No. 62/261,161, filed Nov. 30, 2015 entitled, "System and Methods of Segmenting Vessels from Medical Imaging Data," the content of which is hereby incorporated by reference herein in its entirety.

STATEMENT REGARDING FEDERALLY SPONSORED RESEARCH OR DEVELOPMENT

None.

REFERENCE TO SEQUENTIAL LISTING, ETC

None.

BACKGROUND

1. Technical Field

The present disclosure relates generally to image processing of image data and, more specifically, to image processing methods that allow the generation of vessel models in arbitrary volumetric data.

2. Description of the Related Art

Three-dimensional (3D) structures from computed tomography (CT) and magnetic resonance (MR) scans are often used by doctors as non-invasive methods for imaging certain parts of the body such as, for example, the heart and the vessels that are contained in the heart. For example, when examining a patient's cardiac health, doctors often rely on these scans to determine if there are vessels that indicate whether the patient needs further medical attention. When using these medical images to measure a patient's cardiac health, quantitative information regarding the heart and its vessels may be extracted through identification and computation of various contiguous regions of the heart. It will be appreciated by those skilled in the art that doctors relying on these scans may study other body parts of interest and the vessels contained therein in evaluating a patient's health. The identification of these regions may be referred to as segmentation and, more specifically, vessel segmentation and vessel model generation.

Current technologies that are used for vessel segmentation and identification may require that some image processing be performed on the arbitrary volumetric data before segmenting portions of the image to determine vessels. These tools may be time-consuming and less dynamic. While other existing tools also allow users to add a sequence of points that are used to identify vessels from an image data, these existing tools require an input sequence that cannot be easily edited.

Accordingly, there is a need for dynamic methods that allow a user to interactively generate vessel models from medical imaging data and are efficient, fast and less rigid. There is a need for methods that allow modification of a sequence by a user and other options which allow a user to specify or choose options in modifying portions of a vessel when using the tool to segment the vessels.

SUMMARY

A system and methods of segmenting one or more vessels from medical image data are disclosed. A method of segmenting a vessel from image data includes accessing through a user display interface an image data from which a vessel is segmented. A first seed point is then received from a user, the first seed point placed by the user on a first location on the image data. A second seed point is also received from the user, the second seed point placed by the user on a second location on the image data. Using the first and the second seed points, a centerline of the vessel to be segmented is calculated—the calculation of the centerline beginning at the first location and finishing at the second location, as indicated by the two seed points, respectively. The calculation of the centerline may utilize a minimum cost dual front propagation method that incrementally accumulates local vessel measures to a form globally optimal cost path that will comprise the centerline. Borders or walls of the vessel may then be calculated based upon the centerline to form a segmented vessel. An output of the segmented vessel may then be displayed using a data structure that includes all the data of the voxels from which measurements and other characteristics of the segmented vessel may be derived.

From the foregoing disclosure and the following detailed description of various example embodiments, it will be apparent to those skilled in the art that the present disclosure provides a significant advance in the art of generating vessel models from arbitrary volumetric data. Additional features and advantages of various example embodiments will be better understood in view of the detailed description provided below.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
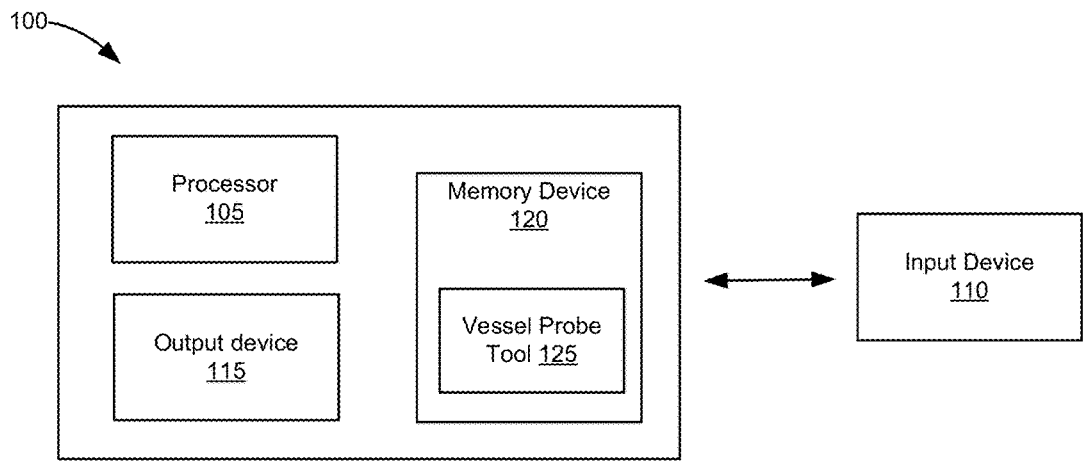
FIG. 1 shows a block diagram of one example computing device having a digital processor communicatively coupled to an input device for performing the example methods disclosed in the present disclosure.

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and/or other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are an example system and example methods for generating vessel models and segmenting a vessel from arbitrary volumetric data using a software application that will be referred herein to as a vessel probe tool.

FIG. 1 shows a block diagram of one example computing device 100 having a digital processor 105 communicatively coupled to an input device 110 for performing the example methods disclosed in the present disclosure. Computing device 100 may include an output device 115 and a non-transitory computer-readable storage memory device 120 for storing one or more programs and other data. Computing device 100 may be a client computer such as, for example, a cell phone, a tablet, a laptop computer, a personal computer, a workstation computer or any other device that includes processor 105 communicatively coupled to memory device 120, such as a random access memory (RAM). Processor 105 executes computer-executable program instructions stored in memory device 120.

Input device 110 may be any device or image source which provides an appropriate image or images for processing in accordance with the present disclosure. For example, input device 110 may be an imaging device, such as a device incorporated in a CT scan, X-ray machine, an MRI scanner or other, or any other appropriate source of imaging data. In some example embodiments, input device 110 may be an image storing device, or any device in communication with another computer or imaging device by way of a direct connection, such as for example, via a local a modulated infrared beam, radio, land line, or satellite, for example, by way of the World Wide Web or Internet.

Output device 115 may include a user interface such as, for example, any suitable displaying apparatus such as a cathode-ray kinescope tube, a plasma display, liquid crystal display, and so forth. Output device 115 may (or may not) include a component for rendering an image and may include memory device 120 or part of the memory device 120 of FIG. 1 for storing an image for further processing or viewing. Output device 115 may utilize a connection or coupling including, such as are noted above, in relation to the input device. Processor 105 is operative with a program or application, such as a vessel probe tool 125 installed in computing device 100, and contains instructions in accordance with the present disclosure for implementing one or more program instructions for generating vessel models from a medical image or medical imaging data.

Vessel probe tool 125 may be an application installed in memory device 120 of computing device 100 and have one or more image processing instructions for use in segmenting vessels and generating vessel models from an image data. Vessel probe tool 125 may be a software application locally installed at computing device 100 that may process one or more images for visualizing and segmenting vessels. In some example embodiments, vessel probe tool 125 may be installed at a computing device remote from computing device 100 and communicatively coupled to computing device 120. Vessel probe tool 125 may include one or more instructions for segmenting vessels and generating a vessel model from an arbitrary volumetric data.

An arbitrary volumetric data may refer to a two-dimensional (2D) projection of a three-dimensional (3D) image data such as, for example, CT scans and MR scans that may be received by computing device 100 from input device 110. CT scans combine a number of X-ray images taken from different angles in order to generate a cross-sectional view of a body part and may be used to identify normal and abnormal structures in the body part of interest. MR scans also provide a multi-dimensional view of a body part through the use of radio waves and magnetic fields in order to form images of the body part. Because of the cross-sectional images that are generated through CR and MR scans, doctors are able to determine measurements of the body part of interest. For the purposes of illustration, the arbitrary volumetric data may also be referred to herein as medical imaging data and may be in 2D or in 3D.

Vessel probe tool 125 may enable users to interactively generate vessel models in medical imaging data by placing seed points on the vessels in the image data. Using the seed points, vessel probe tool 125 computes a vessel centerline which passes through or near the corresponding vessel points, which may not necessarily be the same as the seed points, and uses the centerline to calculate measurements of the vessel being segmented. The seed points may be placed in 2D or 3D images, depending on the user's preference and the visibility of the vessels in the 2D and 3D viewports.

Figure 2:
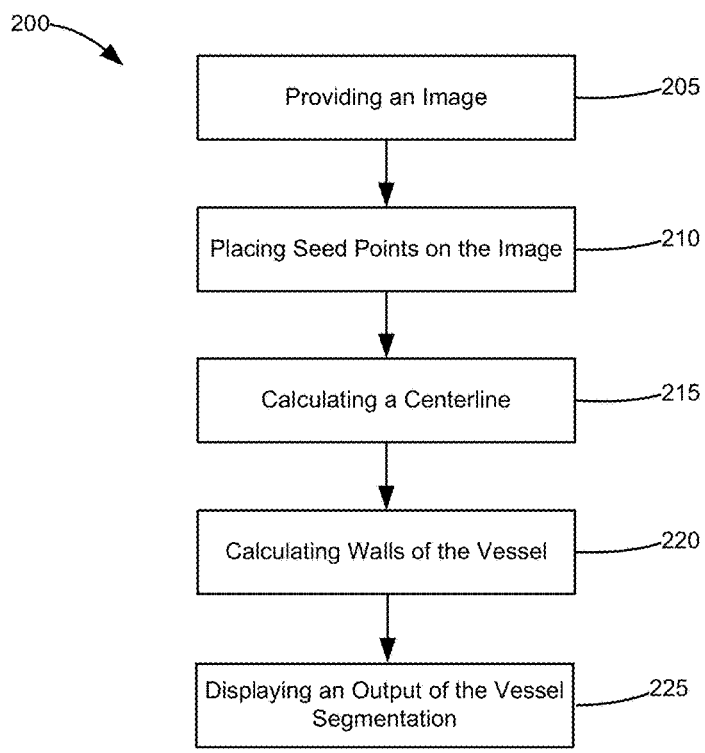
FIG. 2 shows one example method of segmenting a vessel from medical imaging data.

FIG. 2 shows one example method 200 of segmenting a vessel from medical imaging data. The example method 200 may be performed by vessel probe tool 125 and may enable users to interactively generate vessel models and segment vessels from medical imaging data.

At block 205, an image to be processed may be provided. In some example embodiments, providing an image to be processed may include retrieving the image stored in memory device 120 of computing device 100 running vessel probe tool 125. In other example embodiments, providing an image to be processed may include receiving, directly or indirectly, the image from input device 110. The image to be processed may be two-dimensional or three-dimensional. The image may be a raw file such that substantially no pre-processing is performed on the image after it has been captured by its source imaging device or source imaging modality and accessed by vessel probe tool 125 for segmentation. In one example embodiment, pre-processing of the image data is not required for vessel probe tool 125 to segment the data such that there is no delay before vessel probe tool 125 is available for use in segmenting the image data.

Three-dimensional images may be comprised of voxels which may be a value representation of a regular grid in a three-dimensional object. Arbitrary volumetric image data, such as those that may be used in accordance to the present disclosure, may also use voxels to describe graphic information that defines a point in the volumetric data. In contrast to a picture element or pixel that defines a point in a two-dimensional space using x and y coordinates, voxel values include a z-coordinate. Each of the coordinates in a voxel may be defined in terms of its position, color and/or density. Medical imaging data to be processed may be represented in three-dimensional space using images that are defined by voxels to be images of pertinent body parts from different angles.

Figure 5A:
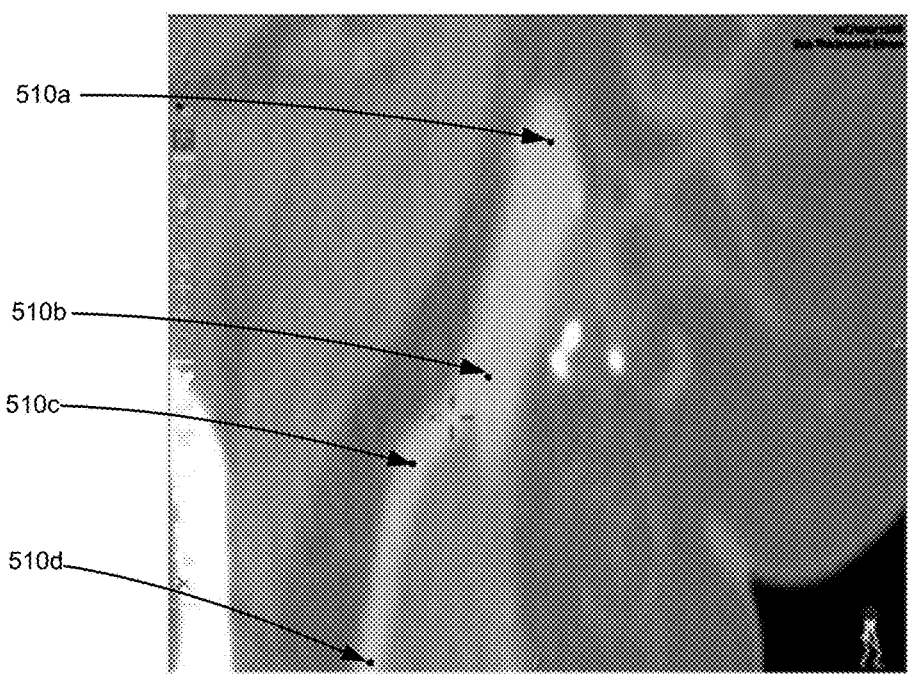
FIG. 5A shows one example user-placed seed points placed by a user on a two-dimensional image with one or more vessels that the user wishes to segment.

At block 210, at least two initial seed points may be placed by the user on the image using vessel probe tool 125. Placing the seed points may be performed by placing, indicating or otherwise identifying at least two points or dots on an area of the vessel that the user wishes to have segmented. FIG. 5A shows one example three-dimensional image data 305 having input seed points 310a, 310b and 310c that may have been entered by a user using vessel probe tool 125.

In some alternative example embodiments, the initial seed points may be received from another algorithmic step or computational engine not involving user input, such as a vessel analysis engine or other similar software. Use of other automatic computational engines for the initial seed points may eliminate the need for user input or action to place the seed points (i.e., user intervention is unnecessary to place the initial seed points). In some example aspects using computational engines, a batch method may be used to automatically place seed points for multiple scans of the same or different patient vessels.

Seed points may refer to one or more points in the image or in the arbitrary volumetric data that is entered by the user as part of a vessel to be segmented. In one alternative example embodiment, the seed points may refer to the region of interest in a vessel that the user wishes to segment. The seed points may be placed by the user in a three-dimensional section of the vessel in the image, in a two-dimensional section, or in a combination of 2D and 3D sections of the image.

In one example embodiment, the seed points entered may be a first seed point that indicates a beginning of the vessel or region of interest (ROI) of the vessel to be segmented, and a second seed point that indicates an end of the vessel or ROI of the vessel to be segmented. At least two seed points that indicate the beginning and the end of the vessel may be placed by the user, but seed points located between the beginning and the end may also be placed such as, for example, seed point 310a placed by the user in the image as the beginning seed point, seed point 310c placed as the end seed point and seed point 310b as an example seed point located between the beginning and the end points of the vessel being segmented.

In some alternative example embodiments, the placement of the seed points may be performed in a sequential manner following one direction. For example, if three seed points are placed in a direction of the blood flow, which for illustrative purposes is from top to bottom, the first placed seed point should indicate the start of the vessel in the direction of the blood flow and should be placed at the topmost portion of the vessel to be segmented such as, for example, seed point 310a. The second and third-placed seed points may then be placed downstream relative to the first seed point 310a. Thus, the three seed point (e.g., seed point 310c) will be placed at the bottom-most section of the vessel to be segmented, with the second seed point (e.g. seed point 310b) placed in between the first and the third seed points.

Figure 3A:
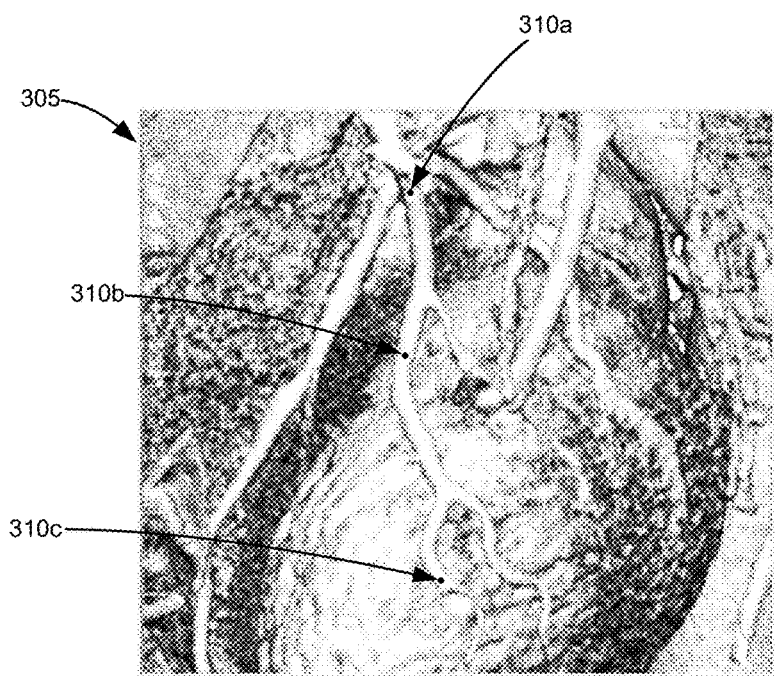
FIG. 3A shows one example three-dimensional image data having input seed points that may have been entered by a user using a vessel probe tool.

Alternatively, the seed points may also be placed sequentially in an opposite direction of the blood flow, as long as they are placed sequentially following one direction. In this alternative example embodiment, the placement of the example seed points in FIG. 3A may be in this order: seed point 310c, seed point 310b, and seed point 310a.

In yet other alternative example embodiments, the user may place a whole series of points by dragging an input device such as, for example, a mouse to draw a centerline across a vessel segment. The series of points may be displayed as a single line drawn by a user following one direction along the vessel that the user wishes to be segmented from the image.

In still other alternative example embodiments, the user may also modify a drawn centerline segment by directly drawing a desired path for the centerline in addition to single seed points that may have been initially added. This example alternative method of modifying or adding a centerline segment may place stricter constraints on the centerline to be computed by vessel probe tool 125 since the drawn centerline path is equivalent to many seed points. However, this is only achieved with a single mouse gesture thereby providing a more convenient user experience.

At block 215, a centerline may be calculated based on the placed seed points. A centerline may be a line that is computationally equidistant (or near equidistant) from a surface or sides of a vessel, or an object. It is desirable to be able to compute or define a centerline through a vessel or region of interest being viewed to provide a reference for segmentation of the vessel. Computing the centerline also defines a frame for the vessel, which may be used to accurately compute length measurements of the vessel being segmented.

Figure 3B:
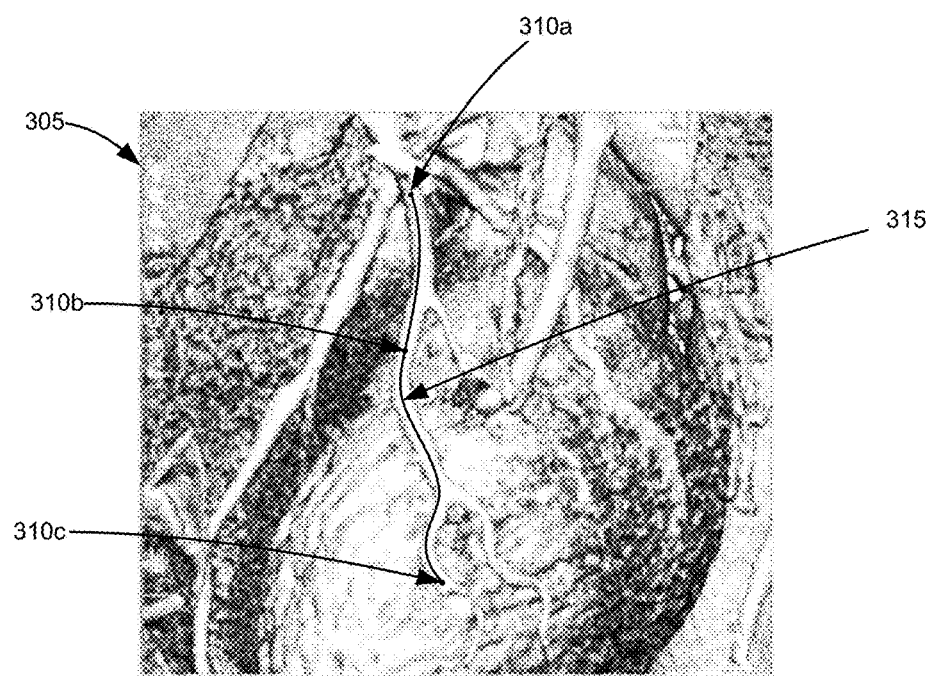
FIG. 3B shows one example centerline that has been calculated based on the placed seed points of FIG. 3A.

FIG. 3B shows one example centerline 315 that has been calculated based on the placed seed points 310a, 310b, and 310c of FIG. 4A. Vessel probe tool 125 calculates the centerline by tracing the paths in the image data that is determined to be the most "vessel-like" paths between successive seed points and concatenating these paths together. In three-dimensional input images, each voxel in the volume may be assigned a value or cost associated with how likely the voxel is a part of a vessel. The cost may be computed using heuristics that are based on intensity, distance of the voxel from vessel boundary, and the local voxel intensity standard deviation, etc. The path, which starts at the starting seed point and finishes at the ending seed point and has voxels with the minimum accumulated cost, will then be considered as the optimal vessel centerline.

When calculating the centerline, the optimal path that is computed is made more efficient by controlling the calculation of the optimal vessel centerline between the at least two seed points to always lie within an ellipsoidal volume between those seed points. As such, the computation of the centerline is not affected by the size of the volume being processed.

The centerline may then be approximated using a cubic-spline curve with the constraint that the control points on the spline curve pass exactly through the centerline points which are closest to the seed points placed by the user, and that the root mean squared deviation of the spline path from the vessel centerline path is minimized. Spline curves provide a mathematical representation for a region of interest in an image that allows a user to design and control a shape of complex curves and surfaces such as vessels. When a user enters a sequence of seed points in a medical image, a curve is constructed whose shape closely follows the sequence. One advantage of using a spline curve to approximate the vessel centerline is that it allows the user to add or delete seed points as required or desired by a user along the vessel centerline while maintaining smoothness and continuity constraints along the length of the vessel. Using spline curves, curved reformats along the vessel curve may also be presented free of artifacts.

To ensure that the deviation of the spline path from the vessel centerline path is minimized, additional control points, which are hidden from the user, may be dynamically generated during the computation of the centerline. These additional control points may be added or deleted as needed while the user is editing a vessel. These hidden control points are computed by the vessel probe tool but are not displayed on the user interface and are, therefore, hidden to a user allowing vessel editing by the user to be much less time-consuming and more intuitive.

The user may modify the centerline segment by directly drawing the desired path even with the presence of sparse seed points that have been previously placed on the image. This places stricter constraints on the centerline computed by the vessel probe tool, since the drawn path is equivalent to many seed points but this is achieved with a single mouse gesture. This seamless integration of sparse seed points and mouse drags is one example embodiment of vessel segmentation provided by vessel probe tool 125.

Figure 4:
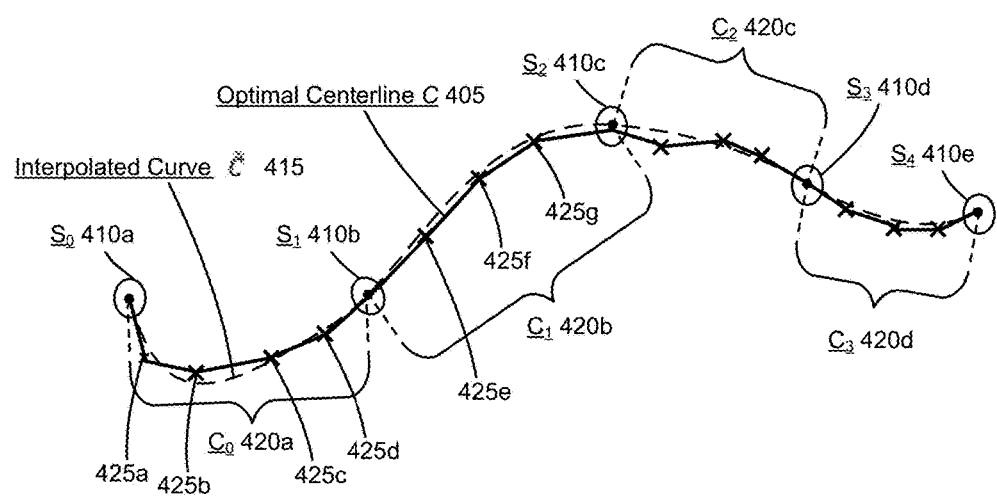
FIG. 4 shows one example vessel curve comprising a sequence of polylines which have been concatenated to each other end-to-end to form a centerline.

FIG. 4 shows one example segmented vessel curve that forms an optimal path or centerline C 405. $S_k$, which are shown as $S_0$ 410a, $S_1$ 410b, $S_2$ 410c, $S_3$ 410d, and $S_4$ 410e, are the seed points that may have been placed by the user and C 415 may be the interpolated spline curve, the calculation of which will be described in further detail below. The example optimal centerline 405 for the vessel may comprise a sequence of polylines or polyline segments $C_k$ shown as $C_0$ 420a, $C_1$ 420b, $C_2$ 420c and $C_3$ 420d. Polyline segments $C_k$ may have been concatenated to each other from end-to-end to form a single curve that may be considered as optimal centerline 405.

Spline curve $\tilde{C}$, 415 may pass through seed points $S_k$ 410a-410e but may not pass through the other points in the polyline such as, for example, polyline points 425a, 425b, 425c and 420d which are polyline points that comprise polyline segment $C_0$ 420a. Polyline segment $C_1$ 420b located between seed points $S_1$ and $S_2$ is also shown as having polyline points 425e, 425f, and 425g.

The traced vessel curve or traced optimal path C 405 comprises a sequence of polylines $C_k$ 420a-420d which have been concatenated to each other end-to-end to form C 405, as shown in FIG. 4. Each of polyline segments $C_k$ 420a-420d may be comprised of a sequence of points that are connected together (with each set of points forming a line segment) that are further connected together to form a single vessel curve. The single vessel curve corresponds to optimal path 405 that forms the centerline between the two seed points (i.e. $S_0$ 410a and $S_4$ 410e) located at the ends of $C_k$ 420a-420d.

Since there may be hundreds, or even thousands of points in optimal vessel centerline C 405, it may become cumbersome to make modifications or corrections to the computed curve through a direct modification of the points of centerline C 405. This is especially true if smoothness and continuity constraints are to be satisfied along the length of the curve. As such, a cubic spline interpolation may be performed to calculate interpolated spline curve $\tilde{C}$ 415. The goal of the cubic spline interpolation is to enable a user to edit a curve easily and intuitively while ensuring smoothness and continuity constraints along the length of the curve.

Let $S_k = \{(s_x^k, s_y^k, s_z^k) | k \in \{0, 1, \ldots, K\}\}$ be the seed points placed by the user and $C_k$ be the traced vessel polyline segment between seed points $S_k$ and $S_{k+1}$. A cubic spline representation $\tilde{C}_k$ of $C_k$ may have the following constraints:

(Condition 1): $\tilde{C}_k$ is as close to $C_k$ as possible in the least squared sense; (Condition 2): $\tilde{C}_k$ and $C_k$ may be at exactly in the same location at the two end points; and (Condition 3): $\tilde{C}_k$ and $C_{k-1}$ have continuous first derivatives at the first end-point, and $\tilde{C}_k$ and $C_{k+1}$ have continuous first derivatives at the second end-point.

Each polyline segment $C_k = \{(x_i^k, y_i^k, z_i^k) | i = \{0, 1, \ldots, n_k-1\}\}$ consists of $n_k$ points where $n_k$ can vary, and since the end points of $C_k$ coincide with the seed points, $(x_0^k, y_0^k, z_0^k) = S_k = (s_x^k, s_y^k, s_z^k)$ and $(x_{n_k-1}^k, y_{n_k-1}^k, z_{n_k-1}^k) = S_{k+1} = (s_x^{k+1}, s_y^{k+1}, s_z^{k+1})$. The cubic spline segment $\tilde{C}_k = (\tilde{x}^k(u), \tilde{y}^k(u), \tilde{z}^k(u))$ is parameterized by a variable $u \in \{0,1\}$ where $\tilde{x}^k(u) = a_0^k + a_1^k u + a_2^k u^2 + a_3^k u^3$, $\tilde{y}^k(u) = b_0^k + b_1^k u + b_2^k u^2 + b_3^k u^3$, $\tilde{z}^k(u) = c_0^k + c_1^k u + c_2^k u^2 + c_3^k u^3$.

The first condition may be satisfied by minimizing the expression $E = \Sigma_{k=0}^{K-1} \Sigma_{i=0}^{n_k-1} |\tilde{C}_k(u_i^k) - (x_i^k, y_i^k, z_i^k)|^2$ where $$\sum_{k=0}^{K-1} \sum_{i=0}^{n_k-1} \left| C_k(u_1^k) - (x_i^k, y_i^k, z_i^k) \right|^2$$

where $u_i^k = \frac{1}{n_k - 1} \in [0, 1]$.

The second condition may be statisfied if $\tilde{C}_k(0)=(x_0^k, y_0^k, z_0^k)$, $\tilde{C}_k(1)=(x_{n_k-1}^k, y_{n_k-1}^k, z_{n_k-1}^k)$ for all $k \in \{0, 1, \ldots, K-1\}$. The third condition may be satisfied if $$\left.\frac{d\tilde{C}_k}{du}\right|_{u=0} = \left.\frac{d\tilde{C}_{k-1}}{du}\right|_{u=1}, \left.\frac{d\tilde{C}_k}{du}\right|_{u=1} = \left.\frac{d\tilde{C}_{k+1}}{du}\right|_{u=0}.$$

All of these conditions are dependent on the spline coefficients $\{(a_i^k, b_i^k, c_i^k)|i \in \{0, 1, 2, 3\}, k \in \{0, 1, \ldots, K-1\}\}$. To satisfy the above conditions, we can show that the x-coefficients, for a particular segment k, are given by solving for $D_0^k$ and $D_1^k$ and in the following simultaneous equations: $\alpha_1+\alpha_2 D_0^k+\alpha_3 D_1^k=0$, $\beta_1\beta_2 D_0^k+\beta_3 D_1^k=0$, wherein $\alpha_1=\Sigma_{i=0}^{n_k-1}(x_0^k-3x_0^k(u_i^k)^2+2x_0^k(u_i^k)^3-x_i^k+3x_{n_k-1}^k(u_i^k)^2-2x_{n_k-1}^k(u_i^k)^3)(u_i^k-2(u_i^k)^2+(u_i^k)^3)$, $\beta_1=\Sigma_{i=0}^{n_k-1}(x_0^k-3x_0^k(u_i^k)^2+2x_0^k(u_i^k)^3-x_i^k+3x_{n_k-1}^k(u_i^k)^2-2x_{n_k-1}^k(u_i^k)^3)(-(u_i^k)^2+(u_i^k)^3)$,
$\beta_2=\Sigma_{i=0}^{n_k-1}(-(u_i^k)^2+(u_i^k)^3)(u_i^k-2(u_i^k)^2+(u_i^k)^3)$,
$\beta_3=\Sigma_{i=0}^{n_k-1}(-(u_i^k)^2+(u_i^k)^3)^2$, The spline coefficients for the x-coordinates of segment k are then given by, $a_0^k=s_x^k$, $a_1^k=D_0^k$, $a_2^k=3(s_x^{k+1}-s_x^k)-2D_0^k-D_1^k$, $a_3^k=2(s_x^k-s_x^{k+1})+D_0^k+D_1^k$, with similar expressions for the y- and z-coordinates.

The vessel computation described in the above paragraphs also auto-tunes its parameters to the vessel type on which the user places the seed points. Thus, a user may select any vessel, i.e., a user is not required to select a vessel with certain characteristics such as, for example, dark and/or bright vessels, small and/or large vessels.

With continued reference to method 200 of FIG. 2, at block 220, walls of the vessel may be computed based on the calculated centerline. At block 225, an output of the segmentation and calculations may be displayed. The output of vessel probe tool 125, upon the calculation of the centerline, may be any data structure that represents the centerline and vessel wall.

Measurements of the vessel being segmented such as, for example, vessel length, vessel width, and the like, may be calculated using the output data structure at any location along the centerline.

Figure 5B:
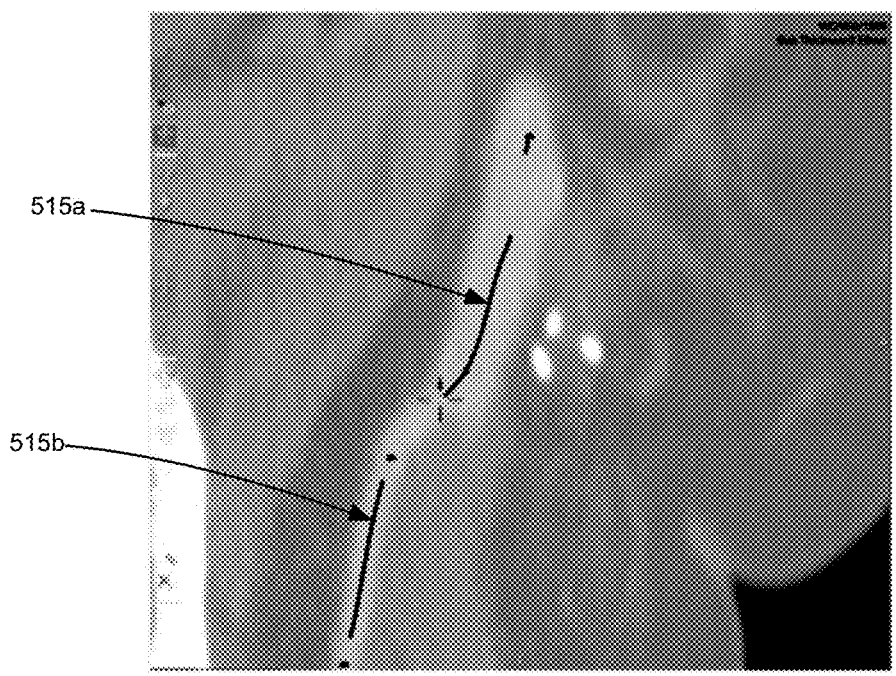
FIG. 5B shows the vessel that was computed using the example seed points placed in FIG. 5A.

FIG. 5A shows example user-placed seed points 510a-510d which may be placed by a user on a two-dimensional image. The image shown in FIG. 5A may include one or more vessels that the user wishes to segment. FIG. 5B shows the vessels 515a and 515b that were computed and segmented using the user-placed seed points 510a-510d. The vessel segmentation shown in FIGS. 5A-5B may include sparse seed points and mouse drags that have been entered by a user to indicate or draw the centerline.

Figure 6:
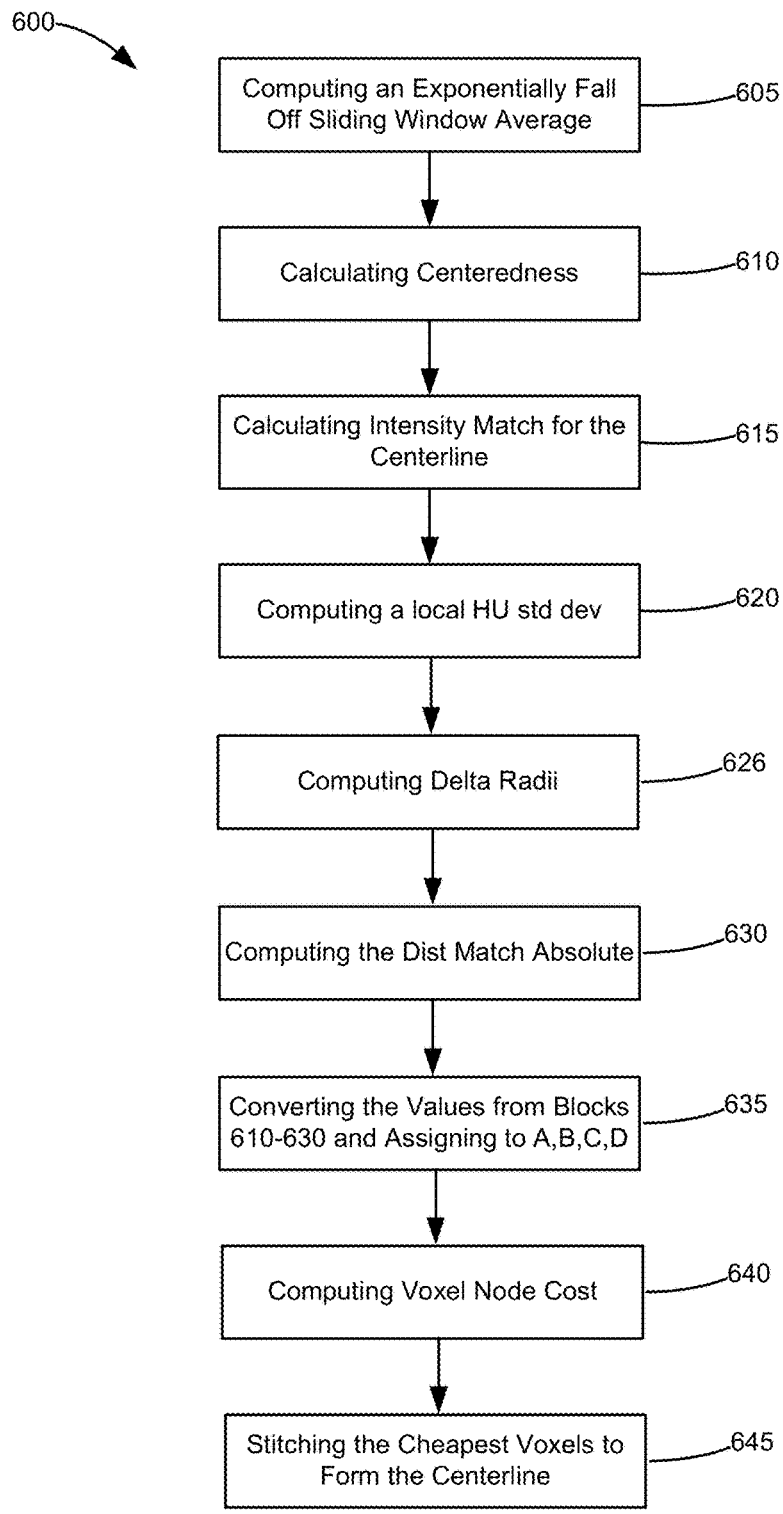
FIG. 6 shows one example method of calculating a vessel centerline using vessel probe tool.

FIG. 6 shows one example method 600 of calculating a vessel centerline using vessel probe tool 125. Example method 600 may be performed by vessel probe tool 125 in conjunction with the steps of segmenting a vessel, as described with reference to FIG. 2.

At block 605, an exponentially moving average, or an exponentially fall off sliding window average of the centeredness, distance-to-vessel boundary, vessel HU range begin/end values, vessel HU average/standard deviation (std dev), and node cost may be incrementally maintained.

This may be performed with a specified percentage for the exponential fall off, such as, for example, a four-percent exponential fall off wherein 4% of the current voxels value is added to 96% of the value accumulated so far. As such, the historical accumulated value loses 4% influence with each voxel down the path from the beginning seed point to the next seed point placed by the user.

At block 610, the centeredness may be calculated. Centeredness may refer to the state of how centered or equidistant from adjacent areas or walls, the location of the centerline is on the vessel to be segmented. The centeredness of the current vessel being segmented may be computed by following orthogonal rays in a round robin fashion along the major axes from the voxel out until in at least one direction, the intensities are twice consecutively beyond the vessel HU range or four times consecutively beyond the inner percentage of the vessel HU range such as, for example, an inner 66% of the vessel HU range. At a slope leaving the intensity range, maximal gradient positions may then be computed from a number of samples approximating the in-between voxels maximum transition point. The in-between voxels may be the voxels located between the beginning and end seed points. The maximal gradient positions may be computed from four samples that approximate the in-between voxels maximum transition point.

The distance to the in-between voxels maximum transition point is taken as a distance to a vessel boundary. An interpolated intensity at the transition point is used to mark one of the vessel HU range beginning point or the vessel HU range end point, depending on the transition being up or down hill.

The other one of the vessel HU range beginning point or end point is computed via symmetric delta from the vessel HU average. If, at this time in the calculation, the other directions, such as the opposite direction, is/are also beyond the vessel HU range, the centeredness measure is increased for each. If there are four or less voxels in the 26 neighborhood of the current voxel that have a higher HU than the center, then the centeredness is further increased, much more so if there a fewer brighter voxels determined to be in the neighborhood. This example method of calculating the centeredness allows for a centeredness measurement that is invariant to the rotational orientation of the vessel.

At block 615, the intensity match for the centerline may be computed. Computing the intensity match may be performed as 1/(1+delta HU) where delta HU is by how many multiples of (3*std dev) the center voxel HU deviates from the historical sliding window value of (avg+1*std dev). This measurement may be minimally biased toward brighter voxels to enable auto self-correction toward a brighter center of a thin vessel.

At block 620, a local HU standard deviation (std dev) may be computed. The local HU std dev may be computed by averaging one or more deltas of the samples computed during the centeredness computation at 610. A fraction std dev of the computed local HU std dev may then be computed versus the historical sliding window HU std dev. Upon computing of the fraction std of the local Hu std dev, an std match may then be computed using the formula: 1/(1+fraction std).

At block 625, a delta radii may be computed wherein delta radii is the number of multiples of the historically averaged distance-to-boundary the current distance-to-boundary is. Using the result, the distance match relative is then computed using 2/(2+delta radii).

At block 630, distance match absolute is computed using the following formula: 1-10/(10+distance from boundary).

At block 635, the values computed at blocks 510-530 may be converted into numbers and assigned variables A, B, C, D, with each value in the range from 1 to 2, representing centeredness, intensity match, fraction standard and distance match (absolute and relative combined), respectively.

At block 640, a voxel node cost may then be computed using node cost=9999/(16*(16−A*B*C*D)). This voxel node cost may then be used in a dual front propagation algorithm to connect the at least two seed points via the least costly path based on the node cost computed at block 540. At block 645, using the cheapest voxel node cost of the plurality of voxels, multiple paths having the cheapest voxel node costs may then be stitched together to form the centerline. It will be noted that if the intensity of the voxel is similar to those of its neighboring voxels, the computed node cost will follow a higher value. It will also be noted that the node cost can also be computed using a different local measure formula, which uses modified or entirely different criteria than those used at blocks 610-630, provided the result is a mapping of voxels close to the centerline path to lower costs than that of voxels further from the intended path.

The dual front propagation method or algorithm starts by placing each seed point into its own heap sorted by node cost. The following steps are then followed alternately for each heap in order to derive the minimum or lowest cost paths to be stitched together to form the centerline:

First, the voxel having the lowest or the cheapest voxel node cost is popped from the active heap. Second, for all the neighboring voxels of the cheapest voxel, the following steps are then performed:

The neighboring voxels of the cheapest voxel are checked to determine if they have been marked as discovered in another heap. Upon a negative determination, where the neighboring voxels have not been marked as discovered in any of the other heaps, the voxel node cost of the neighboring voxels are computed. The neighboring voxels whose cost has been computed may then be marked as discovered, and the now-discovered neighboring voxels are entered into the current heap. Once in the heap, their value plus the value of the center voxel may then be calculated as the accumulated cost value to determine the accumulated cost volume.

Upon a positive determination that the neighboring voxels of the cheapest voxels are marked as discovered, the front propagation process is then determined to be complete, and the example dual propagation method or algorithm then traces back from the point where the fronts of each seed point met. This may be performed by going back to the nodes having the smallest accumulated cost in the accumulated cost volume. The paths are then stitched together to form the desired minimum or lowest cost path for the centerline.

Other example embodiments of segmenting a vessel include variations using more than two seed points; using computed, not user placed, seed points; and using cost computation with modified equations.

It will be understood that the example applications described herein are illustrative and should not be considered limiting. It will be appreciated that the actions described and shown in the example flowcharts may be carried out or performed in any suitable order. It will also be appreciated that not all of the actions described in FIG. 2 or 6 need to be performed in accordance with the example embodiments of the disclosure and/or additional actions may be performed in accordance with other example embodiments of the disclosure.

Many modifications and other example embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for segmenting a vessel from an image data, comprising:
   accessing the image data from which the vessel is segmented;
   receiving a first seed point, the first seed point placed on a first location on the image data receiving a second seed point, the second seed point placed on a second location on the image data;
   calculating a centerline for the vessel to be segmented, the centerline beginning at the first location and finishing at the second location as indicated by the first and the second seed point, respectively;
   calculating borders of the vessel to be segmented based on the centerline; and
   displaying on a user interface an output of the vessel to be segmented using the centerline and the borders of the vessel,
   wherein the calculating the centerline comprises utilizing a minimum cost dual front propagation method that incrementally accumulates local vessel measures to determine a global optimal cost path and form the centerline; and
   wherein the minimum cost dual front propagation method comprises:
      placing each seed point in one of a plurality of heaps, each heap comprising a plurality of voxels;
      determining, from among the plurality of voxels, a voxel having a lowest voxel node cost within each heap;
      determining whether one or more neighboring voxels neighboring the voxel having the lowest node cost are marked in any other of the plurality of heaps;
      in response to determining none of the neighboring voxels are marked in any other of the plurality of heaps, computing a node cost of the neighboring voxels and marking the neighboring voxels as discovered; and
      in response to determining one or more of the voxels neighboring are marked in any other of the plurality of heaps, terminating the dual front propagation method and calculating the centerline using paths having lowest voxel costs.

2. The method of claim 1, wherein the first seed point indicates a starting point of the vessel to be segmented, and the second seed point indicates an ending point of the vessel to be segmented.

3. The method of claim 1, further comprising:
   receiving a third seed point, the third seed point placed at a third location on the image data; and
   recalculating the centerline using the first, second and third seed points, wherein the centerline starts at the first location and ends at the third location on the image data.

4. The method of claim 1, wherein calculating a centerline for the vessel to be segmented utilizes an exponentially falling-off sliding window average of the incrementally accumulated local vessel measures.

5. The method of claim 4, wherein the incrementally accumulated local vessel measures are selected from: a centeredness of the vessel, a distance-to-vessel boundary; a vessel Hounsfield Unit (HU) range begin value; a vessel HU range end value; a vessel HU average; and a vessel HU standard deviation.

6. The method of claim 4, wherein the exponentially falling-off sliding window average is computed by adding a first threshold percentage of a current voxel value to a second threshold percentage of previous incrementally accumulated and corresponding voxel values; and wherein a sum of the first threshold percentage and the second threshold percentage is 100%.

7. The method of claim 1, wherein calculating the centerline further comprises computing:
an intensity match of the centerline;
a local Hounsfield Unit (HU) standard deviation for the centerline;
a delta radii of the centerline; and
a distance match absolute of the centerline; and
computing a voxel node cost based on the intensity match of the centerline, the local HU standard deviation of the centerline, the delta radii of the centerline, and the distance absolute match of the centerline; and
wherein the voxel node cost is used in the dual front propagation method to connect the first and second seed points.

8. The method of claim 1, wherein the accessing the image data includes accessing one or more of:
an unprocessed image data generated by an imaging modality;
a two-dimensional image data from which the vessel is segmented; and
a three-dimensional image data from which the vessel is segmented.

9. The method of claim 1, wherein calculating a centerline for the vessel to be segmented utilizes an exponentially falling-off sliding window average of the incrementally accumulated local vessel measures;
wherein the incrementally accumulated local vessel measures are selected from: a centeredness of the vessel, a distance-to-vessel boundary; a vessel Hounsfield Unit (HU) range begin value; a vessel HU range end value; a vessel HU average; and a vessel HU standard deviation;
wherein the exponentially falling-off sliding window average is computed by adding a first threshold percentage of a current voxel value to a second threshold percentage of previous incrementally accumulated and corresponding voxel values;
wherein a sum of the first threshold percentage and the second threshold percentage is 100%;
wherein calculating the centerline further comprises computing:
an intensity match of the centerline;
a local Hounsfield Unit (HU) standard deviation for the centerline;
a delta radii of the centerline; and
a distance match absolute of the centerline; and
the method further comprising computing a voxel node cost based on the intensity match of the centerline, the local HU standard deviation of the centerline, the delta radii of the centerline, and the distance absolute match of the centerline; and
wherein the voxel node cost is used in the dual front propagation method to connect the first and second seed points; and wherein calculating borders of the vessel comprises computing one or more maximal gradient positions along a slope beyond a threshold vessel Hounsfield Unit (HU) intensity range.

10. A method for segmenting a portion of an image data to partition a vessel from the image data, comprising:
receiving the image data having voxels through a user display interface;
receiving a first seed point from a user, the first seed point placed by the user on a first location on the image data;
receiving a second seed point from the user, the second seed point placed by the user on a second location on the image data, the first and the second locations indicating a starting point of the vessel to be segmented and an ending point of the vessel to be segmented respectively;
determining a plurality of paths between the starting point and the ending point having minimum voxel costs using a minimum cost dual front propagation algorithm;
connecting each of the paths having a minimum voxel costs to form a centerline, the centerline beginning at the starting point and finishing at the ending point as indicated by the first and second seed points received from the user, respectively;
calculating the borders of the vessel to be partitioned based on a centeredness of the centerline, wherein the centeredness of the centerline is computed by following a plurality of orthogonal rays in round robin fashion along one or more major axes of one or more voxels corresponding to the vessel;
displaying an output of the vessel to be portioned by displaying the centerline and the borders of the vessel; and
wherein the minimum cost dual front propagation algorithm comprises:
placing each seed point in one of a plurality of heaps, each heap comprising a plurality of voxels;
determining, from among the plurality of voxels, a voxel having a lowest voxel node cost within each heap;
determining whether one or more neighboring voxels neighboring the voxel having the lowest node cost are marked in any other of the plurality of heaps;
in response to determining none of the neighboring voxels are marked in any other of the plurality of heaps, computing a node cost of the neighboring voxels and marking the neighboring voxels as discovered; and
in response to determining one or more of the voxels neighboring are marked in any other of the plurality of heaps, terminating the dual front propagation algorithm and connecting each of the paths having the minimum voxel costs to form the centerline.

11. The method of claim 10, wherein the receiving the first and second seed points from the user includes receiving the first and second seed points in individual succession following one direction.

12. The method of claim 10, wherein the receiving the first and the second seed points from the user includes receiving a series of seed points from the user, the user dragging an input device to draw a line comprising the series of seed points of the vessel to be partitioned; and wherein the line drawn by the user that comprises the series of seed points of the vessel to be partitioned starts at the first location and finishes at the ending point.

13. The method of claim 10, wherein calculating the borders further comprises determining either or both of:
  two or more consecutive voxels along one of the major axes of the one or more voxels corresponding to the vessel are characterized by an intensity value beyond a threshold vessel Hounsfield Unit (HU) intensity value range; and
  four or more consecutive voxels along one of the major axes of the one or more voxels corresponding to the vessel are characterized by an intensity value beyond an inner percentage threshold vessel HU intensity value range.

14. The method of claim 10, further comprising receiving a modification of the centerline from the user by receiving at least one additional seed point on the image data that is located at a third location; and
  determining a modified centerline by recalculating the paths between the starting point and the modified ending point having minimum voxel costs; and
  wherein the third location of that at least one additional seed point is a modified ending point of the vessel to be segmented.

15. The method of claim 10, wherein calculating the borders of the vessel further comprises computing one or more maximal gradient positions along a slope beyond a threshold vessel Hounsfield Unit (HU) intensity range; and
  wherein the maximal gradient positions are computed from four samples each approximating an in-between voxel maximum transition point.

16. The method of claim 10, wherein the determining paths between the starting point and the ending point having minimum voxel costs includes computing a cost of voxels located between the starting point and the ending point based on at least one of voxel intensity, and a local voxel intensity standard deviation.

17. A computing device having a non-transitory computer readable storage medium including one or more instructions for segmenting a vessel from image data, the one or more instruction comprising:
  accessing the image data from which the vessel is segmented through a user display interface;
  receiving at least two seed points from a user, the at least two seed points placed by the user on two locations in the image data indicating a starting point of the vessel to be segmented and an ending point of the vessel to be segmented, respectively;
  using the two locations of at the at least two seed points, calculating a vessel centerline beginning at the starting point and finishing at the ending point as indicated by the at least two seed points, respectively, by using a minimum cost dual front propagation method that incrementally accumulates local vessel measures to a form globally optimal cost path that will compromise the vessel centerline;
  calculating the borders of the vessel to be segmented based on the vessel centerline; and
  displaying an output of the vessel to be segmented using the vessel centerline and the borders of the vessel; and
  wherein the minimum cost dual front propagation method comprises:
    placing each seed point in one of a plurality of heaps, each heap comprising a plurality of voxels;
    determining, from among the plurality of voxels, a voxel having a lowest voxel node cost within each heap;
    determining whether one or more neighboring voxels neighboring the voxel having the lowest node cost are marked in any other of the plurality of heaps;
      in response to determining none of the neighboring voxels are marked in any other of the plurality of heaps, computing a node cost of the neighboring voxels and marking the neighboring voxels as discovered; and
      in response to determining one or more of the voxels neighboring are marked in any other of the plurality of heaps, terminating the dual front propagation method and calculating the centerline using paths having lowest voxel costs.

18. The computing device of claim 17, where the output of the vessel to be segmented includes measurements of the vessel to be segmented.

19. The computing device of claim 17, further comprising:
  one or more instructions to receive a modification of the vessel centerline from the user by receiving at least one additional seed point on the image data that is located at a third location on the image data; and
  one or more instructions to recalculate the vessel centerline beginning at the starting point and finishing at the third location.

20. The computing device of claim 17, wherein calculating the vessel centerline uses an exponentially moving average or an exponentially falling-off sliding window average of a centeredness of the centerline.

* * * * *